US009026565B2

(12) United States Patent
Zachariassen

(10) Patent No.: US 9,026,565 B2
(45) Date of Patent: May 5, 2015

(54) REAL-TIME DATA TRANSFORMATION TO ACCESS FOREIGN DATA SOURCES

(75) Inventor: Rayan Zachariassen, Toronto (CA)

(73) Assignee: Intel Corporation, Santa Clara, CA (US)

( * ) Notice: Subject to any disclaimer, the term of this patent is extended or adjusted under 35 U.S.C. 154(b) by 227 days.

(21) Appl. No.: 13/504,081

(22) PCT Filed: Oct. 26, 2010

(86) PCT No.: PCT/CA2010/001675
§ 371 (c)(1),
(2), (4) Date: Apr. 25, 2012

(87) PCT Pub. No.: WO2011/050451
PCT Pub. Date: May 5, 2011

(65) Prior Publication Data
US 2012/0221612 A1     Aug. 30, 2012

Related U.S. Application Data

(60) Provisional application No. 61/256,700, filed on Oct. 30, 2009.

(51) Int. Cl.
*G06F 17/30* (2006.01)
*G06F 9/44* (2006.01)
(52) U.S. Cl.
CPC ........ *G06F 17/30067* (2013.01); *G06F 9/4401* (2013.01)
(58) Field of Classification Search
USPC ............ 707/821–823, 827; 717/167; 713/164
See application file for complete search history.

(56) References Cited

U.S. PATENT DOCUMENTS

| | | | |
|---|---|---|---|
| 5,317,728 A | 5/1994 | Tevis et al. | |
| 5,991,542 A * | 11/1999 | Han et al. | 717/167 |
| 6,374,268 B1 | 4/2002 | Testardi | |
| 6,389,427 B1 | 5/2002 | Faulkner | |
| 7,136,867 B1 * | 11/2006 | Chatterjee et al. | 713/171 |
| 7,356,679 B1 * | 4/2008 | Le et al. | 713/1 |
| 7,363,331 B2 * | 4/2008 | Karasudani et al. | 707/737 |
| 7,809,692 B1 * | 10/2010 | Pruthi et al. | 707/674 |
| 7,843,906 B1 * | 11/2010 | Chidambaram et al. | 370/386 |
| 7,843,907 B1 * | 11/2010 | Abou-Emara et al. | 370/386 |
| 7,849,169 B2 * | 12/2010 | Haun et al. | 709/222 |
| 7,990,994 B1 * | 8/2011 | Yeh et al. | 370/431 |
| 8,176,094 B2 * | 5/2012 | Friedman | 707/803 |
| 8,209,680 B1 * | 6/2012 | Le et al. | 717/174 |
| 8,862,633 B2 * | 10/2014 | Friedman | 707/803 |

(Continued)

OTHER PUBLICATIONS

Office Action from Canadian Application No. 2,775,210, Mar. 27, 2014, 4 pages.

(Continued)

*Primary Examiner* — Hanh Thai
(74) *Attorney, Agent, or Firm* — Blakely, Sokoloff, Taylor & Zafman LLP

(57) ABSTRACT

A method for providing access to a file by a requestor including creating an empty file in a format understood by the requestor, intercepting one or more reads by the requestor of the empty file, determining if a portion of the empty file being read by the requestor should contain expected content, if the portion of the empty file should contain expected content then, before fulfill ling the read, adding the expected content to the empty file to transform the empty file into a requested file, and fulfilling a read of the requested file.

17 Claims, 3 Drawing Sheets

(56) References Cited

U.S. PATENT DOCUMENTS

| | | |
|---|---|---|
| 2003/0130986 A1 | 7/2003 | Tamer et al. |
| 2004/0117610 A1* | 6/2004 | Hensley .......................... 713/2 |
| 2005/0149726 A1* | 7/2005 | Joshi et al. .................... 713/164 |
| 2007/0016622 A1 | 1/2007 | Havewala et al. |
| 2009/0198731 A1 | 8/2009 | Noonan, III |
| 2009/0260007 A1* | 10/2009 | Beaty et al. .................... 718/1 |
| 2010/0287155 A1* | 11/2010 | Reisman ....................... 707/709 |
| 2011/0040812 A1* | 2/2011 | Phillips ......................... 707/822 |
| 2011/0055299 A1* | 3/2011 | Phillips ......................... 707/827 |
| 2011/0153697 A1* | 6/2011 | Nickolov et al. ............. 707/827 |
| 2013/0117766 A1* | 5/2013 | Bax et al. ...................... 719/323 |

OTHER PUBLICATIONS

Office Action from Canadian Application No. 2,775,210, Jun. 19, 2014, 3 pages.

Office Action from Canadian Application No. 2,775,210, Sep. 10, 2013, 4 pages.

Office Action from Canadian Application No. 2,775,210, Mar. 4, 2013, 6 pages.

Office Action from Canadian Application No. 2,775,210, Jul. 24, 2012, 5 pages.

* cited by examiner

REAL-TIME DATA TRANSFORMATION TO ACCESS FOREIGN DATA SOURCES

FIELD OF THE INVENTION

The present invention relates to the field of on demand data transformation, and more specifically to on demand data transformation to enable a program to access foreign data sources, for example to create a bootable disk image in real time from a filesystem.

BACKGROUND OF THE INVENTION

Any computer boots from power-off to a useful state using a boot process that involves finding and fetching the computer operating system kernel from a boot medium (for example disk, or network), and then having the kernel attach to a root file system in order to find the files and other data it requires to operate normally.

In all current computer systems this boot process can use a local storage medium (disk or other static memory) to provide all the data required for the boot process, and some computer systems enabled for network booting allow the required data to be copied from a remote source to a local storage medium either all at once as a downloaded disk image, or on demand as needed using a remote disk protocol (for example iSCSI or Sun ND). These boot processes and operating system kernels all expect a data source that looks like a random access block device (normally a disk) where the data source supplies data blocks by address and the requestor uses an organizing convention (a filesystem) to interpret and maintain the data on the block device.

Some boot processes and operating system kernels can also use a data source which supplies data by name, for example those that support "root on NFS" such as Solaris, and Linux. The traditional way to transform a named data source, such as a filesystem as presented by an operating system kernel to applications, to an address based data source as is required by some boot processes and operating systems in order to function, is to first create an image of an appropriate empty filesystem on disk, then populate that filesystem as required thereby filling the image of the filesystem on disk with data blocks that can subsequently be used by the boot process and operating system kernel of interest.

SUMMARY OF THE INVENTION

According to one embodiment of the invention, a method for providing access to a file by a requestor includes the steps of creating a file in a format understood by the requestor; intercepting one or more reads by the requestor of the file; determining if a portion of the file being read by the requestor is empty but should contain expected content, if the portion of the file should contain expected content then, before fulfilling the read, adding the expected content to the portion of the file being read to transform the empty portion of the file into a requested portion of the file; and, fulfilling a read of the requested portion of the file. The file may be created as an empty, shell file, or may be created including initial content. Preferably, an empty file is created.

According to one aspect of the invention, the particular content is organizing information for the contents of the empty file. Preferably, the particular content is either organizing information for the contents of the empty file or expected stored data.

According to another aspect, the method further includes the step of arranging to intercept one or more reads for a portion of the requested file that are referenced by contents of a portion of the requested file being read. Optionally, a portion of the empty file may be filled prior to the intercepting step.

Preferably, the organizing information is filesystem information that may be used by an operating system kernel to boot or to mount and use as a filesystem. Alternatively, the filesystem information may be for use by a boot process in a booting a computer system.

In a particular use of the method of the invention, the determining step includes identifying a sector of the empty file being read and associating the sector being read with the expected content. For example, if the sector being read includes any one of sectors 0-15, these sectors are associated with NTFS filesystem information.

According to another embodiment of the invention, there is provided a method for providing access to data by a requestor comprising the steps of creating an empty file in a format understood by the requestor; intercepting one or more reads by the requester of the empty file; determining if a portion of the empty file being read by the requestor should contain organizing information for the empty file, if the portion of the empty file should contain organizing information then, before fulfilling the read, adding organizing information to the empty file to transform the requested portion of the empty file into a portion of the requested file; determining if a portion of the requested file being read by the requestor should contain data then, before fulfilling the read, copying data from a data source to the portion of the requested file; and, fulfilling a read of that portion of the requested file.

According to another embodiment of the invention, there is provided a machine readable medium having computer executable instructions thereon which when executed by a computer carry out the method of one of the aforementioned embodiments.

According to another embodiment of the invention, there is a provided a system for creating a file being accessed by a requestor including a computer system having an application thereon for creating an empty file on a storage medium in a format understood by the requestor. The application is adapted to intercept one or more reads by the requestor of the empty file on the storage medium, and is further adapted to determine if a portion of the empty file being read should contain expected content, and if so, then before fulfilling the read, adding the expected content to the empty file to transform the empty file into a requested file on the storage medium.

According to various aspects of this embodiment, the system is adapted to carry out the method of various embodiments of the invention as herein described. Preferably, the system of this embodiment provides filesystem and other boot information, such as a boot disk, to a local, remote, or networked computer system.

It is thus an object of this invention to obviate or mitigate at least one of the above mentioned disadvantages of the prior art.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinbelow.

BRIEF DESCRIPTION OF THE DRAWINGS

The invention will now be described in more detail, by way of example only, with reference to the accompanying drawings, in which like numbers refer to like elements, wherein.

DETAILED DESCRIPTION OF THE PREFERRED EMBODIMENTS

Figure 1:
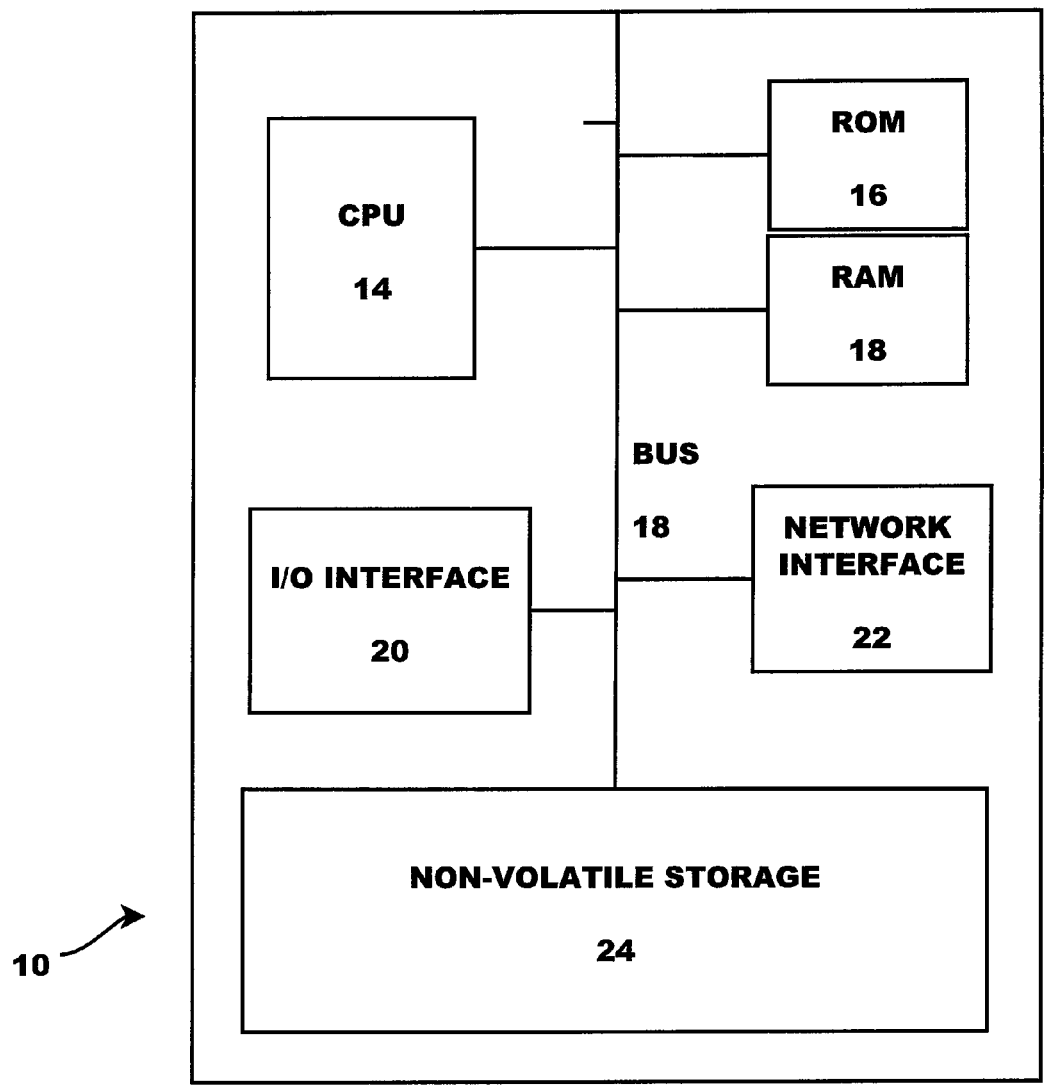
FIG. 1 shows a general computer system on which the present invention may be implemented.

Referring now to FIG. 1, there is shown an exemplary computer system 10 on which an operating system is organized and configured is shown. The computer system 10 has a number of physical and logical components, including a bus 12 and a CPU 14 attached to the bus 12 for performing the processing functions of the computer system 10. Also provided are read only memory (ROM) 16 and random access memory (RAM) 18 for use by the CPU 14. An input/output interface 20 allows for input to be received from one or more devices, such as a keyboard, a mouse, etc., and outputs information to output devices, such as a display and/or speakers. A network interface 22 enables communication with other systems. Non-volatile storage means 24 stores the operating system and programs. The non-volatile storage means 24 may include a hard disk drive, a network drive, or other devices as are known in the art. During operation of the computer system 10, the operating system, the programs and data may be retrieved from the non-volatile storage means 24 and placed in RAM 18 to facilitate execution.

The central component of the operating system is a kernel that acts as a bridge between the programs and the processing being done at the hardware level of the computer system 10. When the computer system 10 is booted, a non-volatile storage device provides all data required for the boot process based on requests and instructions from the kernel. In the case where the non-volatile storage means 24 is a network drive, the computer system being enabled for network booting allows the required data to be copied from a remote non-volatile storage medium to a local non-volatile storage medium either all at once as a downloadable disk image, or on demand as needing using a remote disk protocol. Various remote disk protocols are known in the art, for example, those commonly known as iSCSI or Sun ND. Boot processes and kernels mostly expect a data source stored as a random access block device where the data source supplies data blocks by address and the boot process or kernel uses an organizing convention to interpret and maintain the data on the block device, typically a disk. The organizing conventions may differ and are typically referred to as the filesystem.

The invention generally relates to a method and system for transforming data to provide real-time or just-in-time access to foreign data sources. In a preferred use of the method and system of the invention, a disk image can be created, for example for use as a boot disk, accessible preferably over a network connection, and may be provided in real-time or just-in-time. The invention provides the advantage that the filesystem from which the disk image is created may be maintained by external processes as a filesystem and not as a disk and may be reflected in real time into a boot disk as a kernel needs it to be used. In a preferred use, the invention provides that given an application view of named data, such as provided by a filesystem or a database, this view may be transformed into a disk image which when suitably accessed is useable by a boot process and/or by an operating system kernel that requires a disk image to function. This transformation provides for just-in-time completion of the disk image. As will be appreciated by those skilled in the art, in the preferred use, the just-in-time, or real-time completion of the disk image allows a boot disk to be created in an on-demand manner, for example for installation on different files stems operating systems, or platforms.

Figure 2:
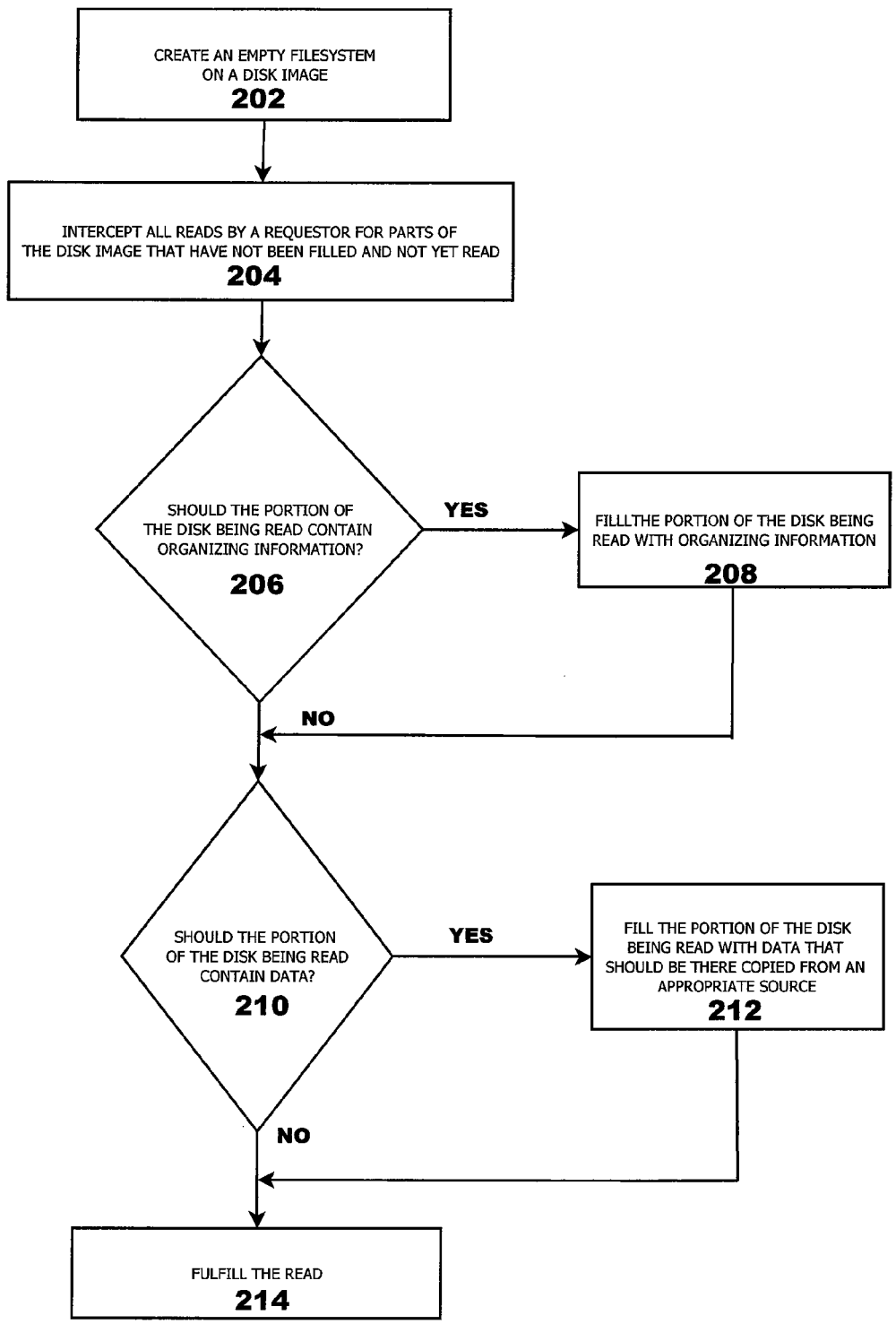
FIG. 2 is a flowchart showing a method according to one embodiment of the invention.

Referring now to FIG. 2, there is shown one embodiment of a method according to the invention, including the steps of creating an empty file on a disk image 202 and intercepting all reads by a requestor from the disk image 204. The requestor may be any application or system element reading the disk image, and is preferably a boot process or the operating system kernel. In step 206, the method according to the invention determines whether a disk block attempting to be read by the requestor contains organizing information for the file and if so, in step 208, before fulfilling the read, adding organizing information to the disk image that would be stored in the disk block being read and arranging to intercept reads for all disk blocks in the disk image that are referred to by the contents of the disk block. Preferably, the disk blocks being referred may be referred to either explicitly or implicitly. In step 210, the method determines if a disk block being read has never been written, but should contain data. If so, step 212 is carried out, whereby before fulfilling the read, data is copied from the appropriate source of named data to the disk block. Finally, in step 214, the read is fulfilled, and the method repeats for each disk block being read.

As will be understood by those skilled in the art, the method shown in FIG. 2 is to be considered exemplary of the invention, but is not the only arrangement of the method. For example, steps 206 and 210 may be carried out in a different order, may be carried out simultaneously, or one of the two may be omitted entirely. Furthermore, the invention contemplates the provision that the empty file being created as referred to above and throughout the description may be created with partially pre-filled content. That is the first step of the method may comprise creating a file having pre-filled content thereon.

The method of FIG. 2 functions since a requestor kernel (or hoot process) cannot request any data on the disk image that was not referenced by other data on the disk image that the kernel already read. The method of the invention is able to provide any information or data that the kernel could possibly access based on what it has already accessed.

Figure 3:
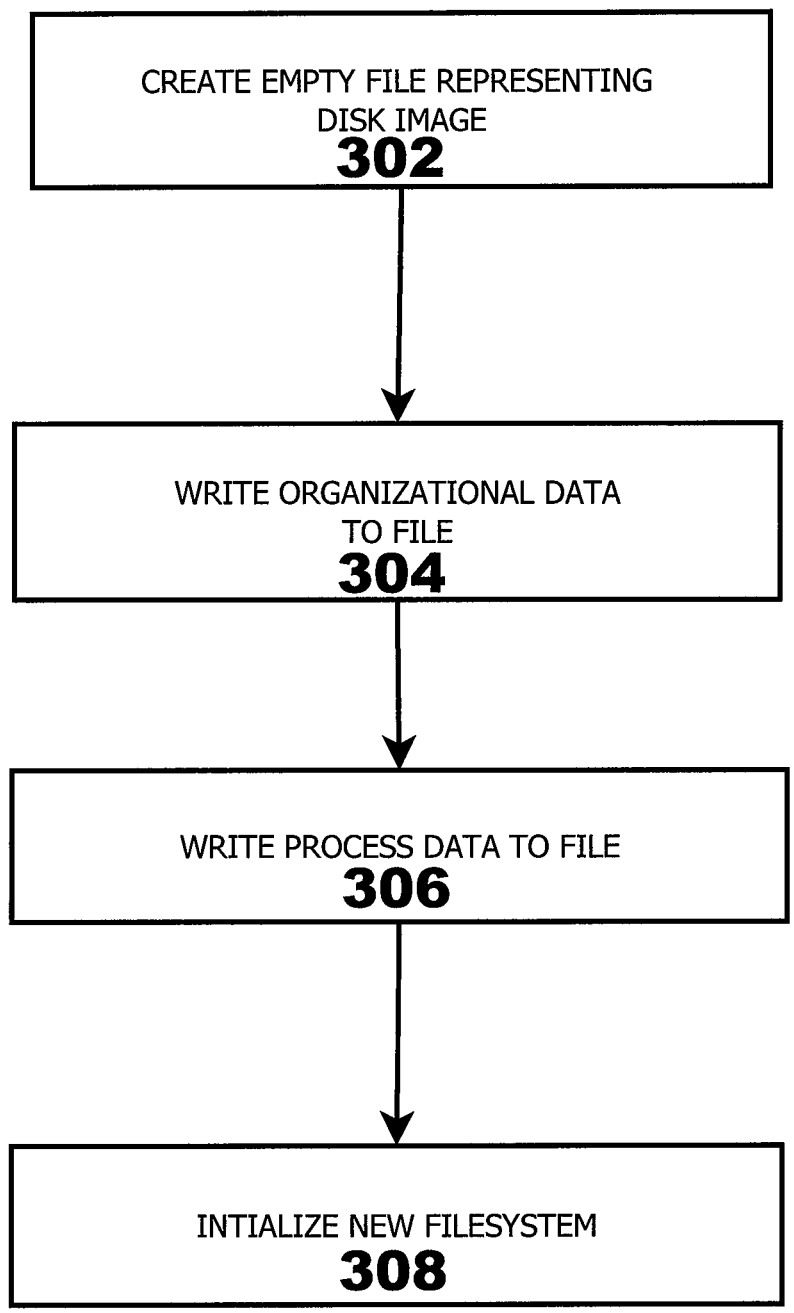
FIG. 3 is a flowchart showing the steps involved in initializing a new filesystem for use in the method of FIG. 2.

When an empty file on a disk image is created as per step 202 above, the following steps are carried out, with reference to FIG. 3. In step 302, an empty file representing the disk image is created. Next, in step 304, data is written to the file to establish normal disk organization structures, such as disk partitions. Data is written to the file in step 306 to enable the boot process to proceed. This data includes a Master Boot Record at section 0 of the disk image, and one or more boot records as appropriate for partitions or sub-partitions. This step is generally known in the prior art and therefore not described in further detail. In step 308, a new filesystem is initialized on the appropriate portion of the disk image as determined by partition table information written in step 304.

To enable the disk image to serve as the disk image for the kernel, the file must be made available to a real or virtual machine running the kernel in a way that is supported by the virtual machine and/or kernel. In making the file available in this manner, a mechanism must also be enabled that allows the interception of reads by the kernel of the disk image, as required in certain embodiments of the invention. Typically, this may be done by providing a storage networking standard for linking the disk image, the requester, and the application creating the boot disk. One possible standard is the iSCSI standard, whereby the instructions for carrying out the method of the invention may be stored an iSCSI target server, thereby making the instructions available to all applications and data sources. iSCSI is a well known interface for facilitating data transfers over networked connections and to manage storage and data transfer over long distances. An alternative example is to attach the instructions for carrying out the invention to a FUSE (Filesystem in user space) program. In this alternative example, a fully accessible virtual filesystem is created containing the instructions for carrying out the invention. This virtual filesystem provides the link between the disk image, the requester and the application creating the boot disk.

Next, in steps 206 to 210 of FIG. 2, the method of the invention requires the disk block being read by the requester to be interpreted, and to modify the disk image in a way that will be understood by the requestor when subsequently reading blocks from the disk image. The application carrying out the method of the invention preferably has available to it an implementation of the same on-disk filesystem that the requestor uses to interpret and to modify disk blocks on the disk image. Due to caching of disk blocks by the requestor, the method of the invention preferably ensures that any modification it initiates to the disk image only happens in disk blocks that have not already been read by the requester, and in a similar manner, any modifications initiated by the requestor happen only in disk blocks that will not be modified again by the invention. This can be arranged in a number of ways, including, for example, reserving space on the disk image for organizing information that the requestor will never need to modify. In another aspect, a cooperating process as an application may be provided using the requestor communicating with the application of the invention to circumvent caching effects. In another alternative, the requestor may receive organizing information from the disk image that makes the requestor believe certain space on the disk image is reserved when the actual information on the disk image indicates otherwise. In yet another alternative, organizing information on the disk image may be pre-filled such that only data block reads need to be intercepted and filled with their proper contents prior to fulfilling the read request.

In completing step 208 of FIG. 2, when completing the organizing information on the disk image, a map is created between data blocks on the disk image and their proper content sourced independently, for example from an external filesystem or database. This enables trap processing of reads by the kernel from the disk image to fill unfilled data blocks as necessary to service read requests from the kernel.

As will now be appreciated by those skilled in the art, the invention enables real-time or just-in-time completion of a disk image to service a requestor, such as a kernel or a boot process. It is further contemplated that the disk image may also be pre-filled partially or completely by an auxiliary application in advance of or simultaneously with making the disk image available to the requestor. The auxiliary application could be a filesystem integrity checker or other program aware of the organizing principles of the filesystem on the disk image, or it could use a different interface that provides an application view of the filesystem on the disk image similarly to the application view that would be provided by the requestor.

Thus, it is now possible, for example, to create a bootable Windows™ disk in real time from an application view of a Windows™ filesystem. Windows™ filesystems are normally stored on an NTFS formatted partition and Windows™ can boot from a bootable disk with an NTFS partition. For a Windows™ bootable disk to function, there is provided a Master Boot Record at sector 0 on the disk, an NTFS boot record at sector 0 on the NTFS partition, an NTFS boot code at sectors 1-15 on the NTFS partition and an NTFS filesystem with appropriate contents on the NTFS partition. In addition, the Windows™ kernel has a number of requirements for booting, all fulfilled by a typical Windows™ installation.

In this example, an application, such as NTFS-3g, may be used to provide the filesystem knowledge required by the method of the present invention. NTFS-3g provides an NTFS implementation that uses a Filesystem in user space (FUSE) facility that exists for many operating systems. The method according to the invention can use FUSE to make available a file that represents the disk it is emulating. The file can then be used as a boot device either by using it as an iSCSI target device or by having virtual machines use it as their disk, to provide an emulated disk to a real or virtual Windows™ computer. The application carrying out the method of the invention, by virtue of using FUSE is the actual recipient of reads and writes to/front the file and synthesizes the response. Generally, the file would be backed up by a real file on the local filesystem, and the method of the invention would preferably only synthesize details as necessary, for example the Master Boot Record, and otherwise act as a passthrough for access to disk blocks stored in the file, that had already been filled using NTFS-3g, or by the requestor kernel.

As will be appreciated by those skilled in the art, the invention applies to all situations where a file with structured addressable data can be created and presented dynamically as needed to a requesting application, by keeping track of which portions of the file can possibly be requested by a requesting application based on the requesting application's actions (i.e. reads and writes) from a known entry point to the data in the file if the file represents an appropriate disk or other structured file, and ensuring information or data is available to fill the file as and when needed. For example, known data entry points include the root filesystem mode in Unix systems or the initial Master File Table entries in Windows™ systems.

EXAMPLE

One possible implementation of the invention will now be described. As will be understood by those skilled in the art, this example is for illustrative purposes only and provides exemplary means for implementing parts of the invention herein described. The example below is not considered to be limiting on the invention. The objective in this example is to provide a Window's system boot from files stored in a Linux filesystem.

An NTFS-3G program is used as a basis for implementing the teachings of the invention because a) it contains code that can manipulate an NTFS filesystem which can be used at a high level, and b) it is based on FUSE which allows for the creation of a suitable disk image file for use by a virtual machine program to attach to a virtual machine and boot off the constructed disk image. The NTFS-3G program is modified as follows:

i. Add a special pathname (/@@vmdk) to present the NTFS partition file in a form suitable for a virtual machine program that will be used. For example if using the VirtualBox program, we would use the VMDK format and /@@vmdk is used to access a VMDK format image of the NTFS partition file. Note that this is a representation of a bootable disk image and therefore must have an appropriate partition table and a master boot record in the appropriate locations.

ii. Implement the invention as described herein using the existing NTFS-3G code to allocate space for data and organizational information in the NTFS partition file and update the NTFS-specific data structures therein appropriately, but with a slight modification so that data need not be actually copied into the allocated space until a read of the allocated but unfilled space is later requested.

iii. Upon startup, simulate a read of the top level (root) directory to initialize the entry point to the filesystem that the kernel running in the virtual machine will initially access.

Create a Windows file hierarchy on a Linux system, for example copy the entire filesystem from a Windows XP machine to a Linux system. For this example, it is placed in WINXP.

Create an empty NTFS filesystem in a file (here called that represents an NTFS partition, for example using this command suitable for Windows XP:
/usr/sbin/mkntfs-Q-I-c4096-F--sector-size512--heads255-- sectors-per-track63-partition-start63 RAW10000000

Mount the NTFS filesystem in RAW on the MNT directory.

As an optional step, in order to pre-fill the RAW file with organizing information so the only intercepts required are for data that must be copied from the files in the WINXP hierarchy, the easiest way is to traverse all the metadata of the Windows filesystem with a command such as "find MNT— print"

Finally start the virtual machine engine program (VirtualBox), configured with a virtual machine that uses MNT/ @@vmdk as its primary disk image file.

Start the virtual machine running. It will boot and run off the WINXP file hierarchy on the Linux machine.

The invention can thus be used with all standard Linux filesystem tools to create and maintain Windows file hierarchies that can essentially instantly (in the time it takes to create an empty NTFS partition file and start the invention program) be turned into bootable disks.

Various other embodiments and modifications to the method and system according to the invention are possible and will be appreciated by those skilled in the art, without departing from the spirit and scope of the invention, which is limited only by the accompanying claims.

The invention claimed is:

1. A method for providing access to a file by a requestor comprising:
   creating an empty file representing a disk image in a format understood by the requestor, by;
   intercepting one or more reads by the requestor of said disk image;
   determining if a disk block of said empty file being read by the requestor should contain expected content, if said disk block of said empty file should contain expected content then, before fulfilling the read, adding said expected content to the disk image that would be stored in said disk block of said empty file to transform said empty file being read into a requested file;
   arranging to intercept reads for other disk blocks in the disk image that are referred to by the content of the disk block of said empty file being read; and
   fulfilling a read of said requested file.

2. A method according to claim 1, wherein said particular content comprises organizing information for the contents of said empty file.

3. A method according to claim 2, further comprising arranging to intercept one or more reads for a portion of said requested file that are referenced by contents of a disk block of said requested file being read.

4. A method according to claim 3, wherein a disk block of said empty file is filled prior to said intercepting step.

5. A method according to anyone of claim 2, wherein said organizing information comprises filesystem information.

6. A method according to claim 5, further comprising providing said filesystem information for use by an operating system kernel to boot or to mount as a filesystem.

7. A method according to claim 5, further comprising providing said filesystem information for use by a boot process in booting a computer system.

8. A method according to claim 7, wherein said determining step comprises identifying a portion of said empty file being read and associating said disk block being read with said expected content.

9. A method according to claim 8, wherein said disk block being read comprises anyone of sectors 0-15, and associating said sectors with NTFS filesystem information.

10. A method according to claim 1, where said expected content comprises stored data.

11. A method for providing access to data by a requestor comprising:
   intercepting one or more reads by the requestor of a disk image;
   determining if a disk block of said empty file being read by the requestor should contain organizing information for said empty file, if said disk block of said empty file should contain organizing information then, before fulfilling the read, adding organizing information to the disk image that would be stored in said disk block of said empty file to transform said empty file being read into a requested file; and
   arranging to intercept reads for other disk blocks in the disk image that are referred to by the content of the disk block of said empty file being read;
   determining if a portion of said requested file being read by the requestor should contain data then, before fulfilling the read, copying data from a data source to said portion of said requested file.

12. A system for creating a file being accessed by a requestor comprising:
   a computer system having an application for creating an empty file representing a disk image on a storage medium in a format understood by the requestor;
   said application adapted to intercept one or more reads by the requestor of a disk image on said storage medium; and, said application adapted to determine if a disk block of said empty file being read should contain expected content, if said disk block of said empty file should contain expected content then, before fulfilling the read, adding said expected content to the disk image that would be stored in said disk block of said empty file being read to transform said empty file into a requested file and arranging to intercept reads for other disk blocks in the disk image that are referred to by the content of the disk block of said empty file being read.

13. A system according to claim 12, wherein said application is further adapted to intercept one or more reads for a disk of said requested file that are referenced by contents of a portion of said requested file being read.

14. A system according to claim 12, where said expected content comprises stored data.

15. A system according to claim 12, wherein said file system information is provided for use by an operating system kernel to boot or to mount as a filesystem on a remote computer system.

16. A system according to claim 12, wherein said file system information is provided for use by a boot process in booting a remote computer system.

17. A system for creating a file being accessed by a requestor comprising:
- a computer system having an application for creating a file on a storage medium in a format understood by the requestor;
- said application adapted to intercept one or more reads by the requestor of a disk image on said storage medium; and, said application adapted to determine if a disk of said file being read should contain expected content, if said disk of said file should contain expected content then, before fulfilling the read, adding said expected content to the disk image that would be stored in said disk block of said empty file being read to transform said empty file into a requested file and arranging to intercept reads for other disk blocks in the disk image that are referred to by the content of the disk block of said empty file being read.

* * * * *